(12) United States Patent
Sakata et al.

(10) Patent No.: US 7,158,349 B2
(45) Date of Patent: Jan. 2, 2007

(54) RAMP MEMBER ASSEMBLY INCLUDING FLYING SLIDER IN RECORDING DISK DRIVE

(75) Inventors: Masaharu Sakata, Kawasaki (JP); Tomoyoshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 186 days.

(21) Appl. No.: 11/002,725

(22) Filed: Dec. 2, 2004

(65) Prior Publication Data

US 2005/0128646 A1   Jun. 16, 2005

Related U.S. Application Data

(63) Continuation of application No. PCT/JP02/05418, filed on Jun. 3, 2002.

(51) Int. Cl.
    *G11B 5/54*   (2006.01)
(52) U.S. Cl. .............................. 360/254.6; 360/254.3
(58) Field of Classification Search ............ 360/254.6, 360/254.3, 254.7, 255
    See application file for complete search history.

(56) References Cited

U.S. PATENT DOCUMENTS 4,684,913 A * 8/1987 Yaeger .................... 360/254.3
5,585,980 A * 12/1996 Boutaghou .................. 360/255
5,668,682 A * 9/1997 Matsumoto .............. 360/254.3
5,764,437 A * 6/1998 Meyer et al. ............. 360/254.3
6,515,959 B1 * 2/2003 Fairchild ................. 360/254.6
6,624,978 B1 * 9/2003 Fairchild ................. 360/254.6
7,035,052 B1 * 4/2006 Kim ........................ 360/254.3

FOREIGN PATENT DOCUMENTS

| JP | 6-76507 | 3/1994 |
| JP | 6-162703 | 6/1994 |
| JP | 2001-325778 | 11/2001 |
| JP | 2002-109842 | 4/2002 |

* cited by examiner

*Primary Examiner*—Robert S. Tupper
(74) *Attorney, Agent, or Firm*—Greer, Burns & Crain, Ltd.

(57) ABSTRACT

A ramp member is supported on a flying slider in a load/unload mechanism of a recording medium drive. The flying slider receives a lift at its air bearing surface based on airflow generated along the moving recording medium. The flying slider flies above the recording medium. The flying height of the flying slider can be controlled with a higher accuracy in the same manner as a flying head slider utilized to read and write data from and into the recording medium. The slope of the ramp member on the flying slider can accordingly be kept at a predetermined level above the recording medium with a higher accuracy. Even if the extent of the slope is reduced, the load bar is allowed to reliably contact the slope. This leads to expansion of the data zone on the recording medium.

5 Claims, 4 Drawing Sheets

RAMP MEMBER ASSEMBLY INCLUDING FLYING SLIDER IN RECORDING DISK DRIVE

This application is a continuation of PCT/JP02/05418 Jun. 3, 2002

BACKGROUND OF THE INVENTION

1. Field of the Invention

The present invention relates to a recording medium drive including a load/unload mechanism related to a head slider. In particular, the invention relates to a recording medium drive including: a head slider opposing the air bearing surface to the surface of the recording medium; a load bar fixed to the head slider; and a ramp member receiving the load bar at an inclined surface getting move remote from the surface of the recording medium along the path of movement of the load bar.

2. Description of the Prior Art

A conventional hard disk drive (HDD) sometimes includes a load/unload mechanism. In general, a ramp member of the load/unload mechanism defines a ramp located above the surface of the magnetic recording disk. The ramp defines a slope getting more remote from the surface of the magnetic recording disk at a location more remote from the rotation axis of the magnetic recording disk. When the load bar moves toward the outer periphery of the magnetic recording disk, the load bar is received on the slope. A further movement of the load bar allows the load bar to climb up the slope. The head slider is in this manner distanced from the surface of the magnetic recording disk.

The slope has a larger longitudinal length along the path of movement of the load bar. The slope thus has a larger extent in the vertical direction perpendicular to the surface of the magnetic recording disk. Even if the ramp is displaced or misaligned from the designed position in the vertical direction during assembling of the ramp member, the load bar is allowed to reliably contact the slope irrespective of the vertical displacement or misalignment of the ramp. If the slope has only a smaller longitudinal length, the load bar passes by the slope displaced in the vertical direction.

However, if the slope has a larger longitudinal length in the aforementioned manner, the slope should have a larger extent not only in the vertical direction but also in the radial direction of the magnetic recording disk. The ramp is forced to protrude toward the center of the magnetic recording disk from the periphery of the magnetic recording disk. This causes an expansion of the non-data zone on the magnetic recording disk between the periphery of the magnetic recording disk and the outermost recording track.

SUMMARY OF THE INVENTION

It is accordingly an object of the present invention to provide a ramp member contributing to expansion of a data zone defined on a recording medium.

According to the present invention, there is provided a ramp member assembly for a recording medium drive, comprising: a flying slider opposing its air bearing surface to the surface of the recording medium; and a ramp member fixed to the flying slider, said ramp member defining an inclined surface getting more remote from the surface of the recording medium.

The ramp member assembly enables the establishment of a recording medium drive comprising: a recording medium; a head slider opposing an air bearing surface to the surface of the recording medium; a load bar fixed to the head slider; a ramp member defining an inclined surface getting more remote from the surface of the recording medium along the path of movement of the load bar, said ramp member receiving the load bar at the inclined surface; and a flying slider opposing its air bearing surface to the recording medium, said flying slider supporting the ramp member.

The recording medium drive allows the flying slider to receive airflow when a relative movement is caused between the recording medium and the flying slider. The lift thus acts on the air bearing surface of the flying slider. The flying slider is allowed to fly above the surface of the recording medium. In this case, the flying height of the flying slider can be controlled with a higher accuracy in the same manner as a flying head slider utilized to read and write data from and into the recording medium. The slope of the ramp member on the flying slider can be kept at a predetermined height or level above the surface of the recording medium with a higher accuracy. Even if the extent of the slope is reduced, the load bar is allowed to reliably contact the slope. Accordingly, the ramp member is allowed to retreat to the utmost from the surface of the recording medium. The retreat of the ramp member enables expansion of the data zone on the recording medium.

The recording medium drive may further comprise: a first support member supporting the flying slider; a second support member fixed to an enclosure containing at least the recording medium and the head slider; and a drive member interposed between the first and second support members, said drive member generating a relative displacement between the first and second support members. The drive member enables a minute replacement of the flying slider along the surface of the recording medium. This minute displacement serves to disengage the flying slider from adsorption to the recording medium. In general, a lubricating agent is applied to the surface of the recording medium for protection of the surface. The lubricating agent sometimes generates adsorption or meniscus effect acting on the flying slider contacting the surface of the recording medium. The first support member may be an elastic suspension supporting the flying slider at the tip end thereof, for example.

The recording medium drive may further comprise a lift mechanism contacting at least one of the elastic suspension and the flying slider, said lift mechanism designed to hold the flying slider at a position spaced from the surface of the recording medium. The lift mechanism enables to hold the flying slider at a position spaced from the surface of the recording medium even if the flying slider receives no lift based on the airflow. The flying slider is thus reliably prevented from receiving adsorption to the recording medium.

It should be noted that the aforementioned ramp member assembly may be utilized in a magnetic recording disk drive such as a hard disk drive (HDD), for example. The ramp member assembly of the invention may be utilized in any recording medium drive employing a flying head slider for writing and/or reading data into and/or from the recording medium.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
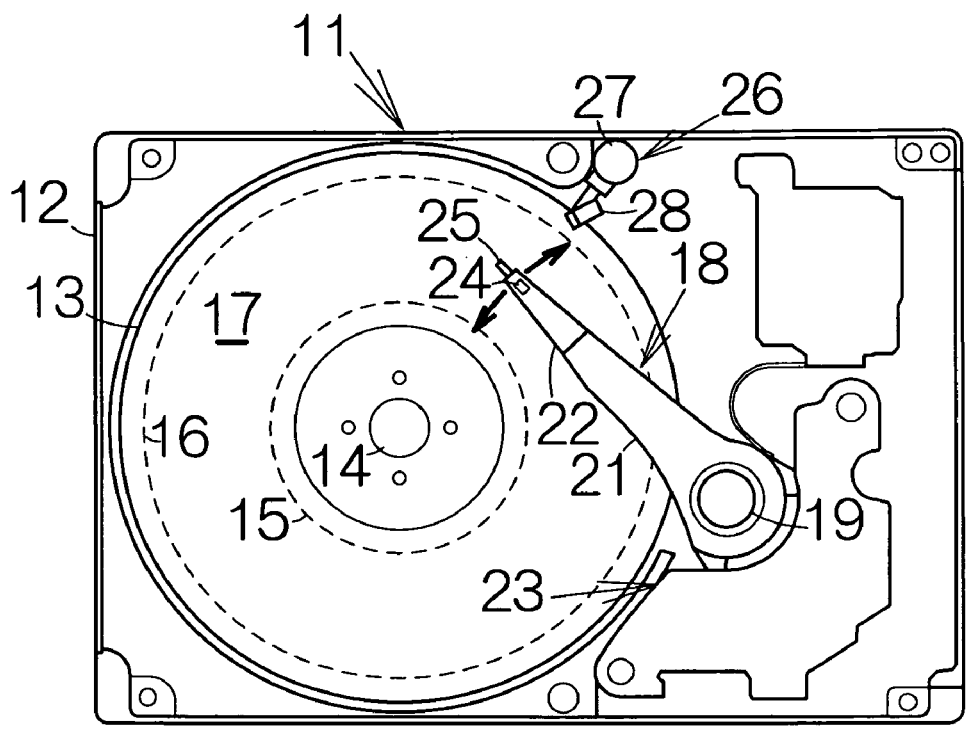
FIG. 1 is a plan view schematically illustrating the structure of a hard disk drive (HDD) according to a first embodiment of the present invention.

FIG. 1 schematically illustrates the inner structure of a hard disk drive (HDD) 11 as an example of a magnetic recording disk drive or storage device according to a first embodiment of the present invention. The HDD 11 includes a box-shaped main enclosure 12 defining an inner space of a flat parallelepiped, for example. At least one magnetic recording disk 13 is contained within the main enclosure 12. The magnetic recording disk or disks 13 is mounted on the driving shaft of a spindle motor 14. The spindle motor 14 is allowed to drive the magnetic recording disk or disks 13 for rotation at a higher revolution speed such as 7,200 rpm, 10,000 rpm, or the like, for example. A cover, not shown, is coupled to the main enclosure 12 so as to define the closed inner space between the main enclosure 12 and the cover itself.

A data zone 17 is defined over the front and back surfaces of the magnetic recording disk 13 between an innermost recording track 15 and an outermost recording track 16. Concentric recording circles or tracks are defined within the data zone 17. No magnetic information is recorded on marginal zone or non-data zone inside the innermost recording track 15. Likewise, no magnetic information is recorded on marginal zone or non-data zone outside the outermost recording track 16.

A head actuator 18 is also contained in the inner space of the main enclosure 12. The head actuator 18 is connected to a vertical support shaft 19 for relative rotation. The head actuator 18 includes rigid actuator arms 21 extending in the horizontal direction from the vertical support shaft 19. Elastic head suspensions 22 are fixed to the corresponding tip ends of the actuator arms 21 so as to further extend in the forward direction from the actuator arms 21. Punching process may be employed to form the actuator arms 21 out of a stainless steel plate, for example. Alternatively, extrusion or molding process may be employed to form the actuator arms 21 from aluminum material. The actuator arms 21 are related to the front and back surfaces of the magnetic recording disk 13, respectively.

When the actuator arms 21 are driven to swing about the support shaft 19, the tip ends of the elastic head suspensions 22 are allowed to move across the corresponding data zones 17 between the innermost and outermost recording tracks 15, 16. When the actuator arms 21 are positioned at a standby position, the tip ends of the elastic head suspensions 22 move beyond the corresponding outermost recording tracks 16 on the magnetic recording disk 13. The tip end of the individual elastic head suspension 22 reaches a position off the magnetic recording disk 13. A power source 23 such as a voice coil motor (VCM) may be employed to realize the swinging movement of the head actuator 18, for example.

A flying head slider 24 is cantilevered at the tip end of the individual elastic head suspension 22 through a gimbal spring, not shown. The elastic head suspension 22 serves to urge the flying head slider 24 toward the surface of the magnetic recording disk 13. When the magnetic recording disk 13 rotates, the flying head slider 24 is allowed to receive airflow generated along the rotating magnetic recording disk 13. The airflow serves to generate a positive pressure or lift on the flying head slider 24. The flying head slider 24 is thus allowed to keep flying above the surface of the magnetic recording disk 13 during the rotation of the magnetic recording disk 13 at a higher stability established by the balance between the urging force of the elastic head suspension 22 and the lift. When the actuator arm 21 is driven to swing in the aforementioned manner during the flight of the flying head slider 24, the flying head slider 24 can thus be positioned right above a target recording track on the magnetic recording disk 13.

An electromagnetic transducer, not shown, is mounted on the flying head slider 24. The electromagnetic transducer may include a write element and a read element. The write element may include a thin film magnetic head designed to write magnetic bit data into the magnetic recording disk 13 by utilizing a magnetic field induced at a thin film coil pattern. The read element may include a giant magnetoresistive (GMR) element or a tunnel-junction magnetoresistive (TMR) element designed to discriminate magnetic bit data on the magnetic recording disk 13 by utilizing variation in the electric resistance of a spin valve film or a tunnel-junction film, for example.

A load bar 25 is attached to the front or tip end of the elastic head suspension 22 so as to further extend in the forward direction from the elastic head suspension 22. The load bar 25 is allowed to move in the radial direction of the magnetic recording disk 13 based on the swinging movement of the actuator arm 21. A ramp member assembly 26 is located outside the magnetic recording disk 13 on the path of movement of the load bar 25. When the actuator arm 21 is kept at the standby position, the ramp member assembly 26 is allowed to receive the load bar 25. The combination of the load bar 25 and the ramp member 26 establishes a so-called load/unload mechanism as described later in detail.

Figure 2:
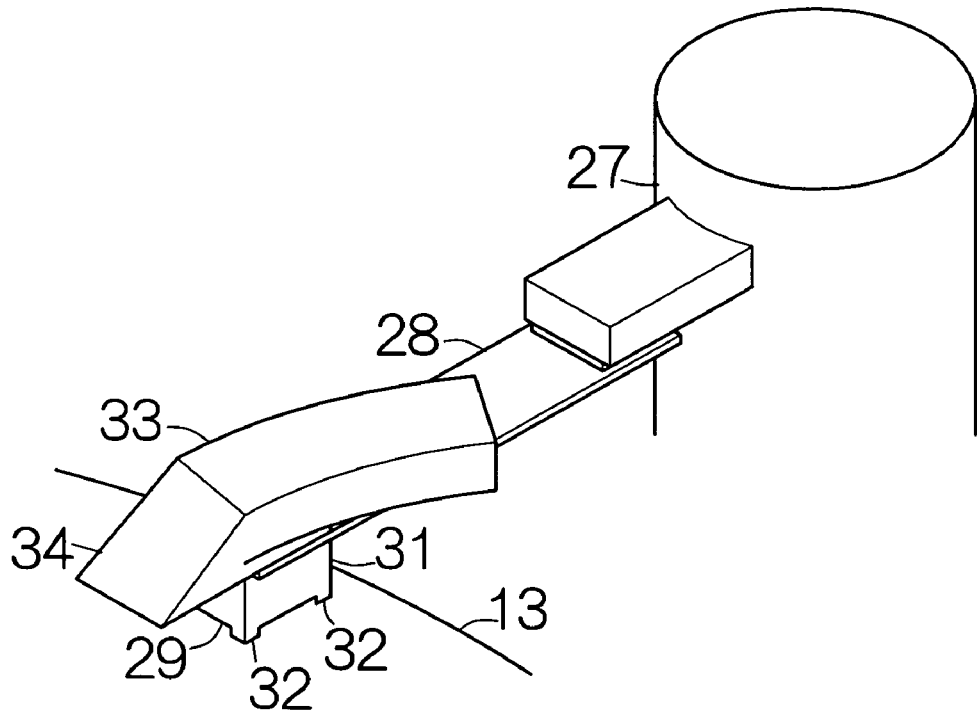
FIG. 2 is an enlarged perspective view schematically illustrating the structure of a ramp member assembly.

The ramp member assembly 26 includes an attachment base 27 fixed on the bottom plate of the main enclosure 12 outside the outer periphery of the magnetic recording disk 13. Elastic suspensions 28 are attached to the attachment base 27. The elastic suspensions 28 extend in the horizontal direction toward the rotation axis of the spindle motor 14. As is apparent from FIG. 2, a flying slider 31 is attached to the tip end of the individual elastic suspension 28. The flying slider 31 is designed to oppose its air bearing surface 29 to the surface of the magnetic recording disk 13. The air bearing surface 29 may be opposed to the non-data zone outside the outermost recording track 16 on the front or back surface of the magnetic recording disk 13. The elastic suspension 28 serves to urge the flying slider 31 toward the surface of the magnetic recording disk 13. When the magnetic recording disk 13 rotates, the flying slider 31 is allowed to receive airflow generated along the rotating magnetic recording disk 13. The airflow serves to generate a positive pressure or lift on the flying slider 31. The flying slider 31 is thus allowed to keep flying above the surface of the magnetic recording disk 13 during the rotation of the magnetic recording disk 13 at a higher stability established by the balance between the urging force of the elastic suspension 28 and the lift.

Adsorption prevention protrusions or pads 32 are formed on the air bearing surface 29 of the flying slider 31. The adsorption prevention pads 32 stand from the air bearing surface 29. The adsorption prevention pads 32 may be located at four corners of the rectangular air bearing surface 29, for example. A lubricating agent spreads over the surface of the magnetic recording disk 13 in a conventional manner. The lubricating agent generates adsorption or meniscus effect acting on the flying slider 31 contacting the surface of the magnetic recording disk 13. The adsorption often hinders the start of the rotation of the magnetic recording disk 13. The adsorption prevention pads 32 are designed to prevent the flying slider 31 from receiving the adsorption.

A ramp member 33 is fixed on the flying slider 31. A slope 34 is defined on the ramp member 33. The slope 34 is designed to gradually get remoter from the surface of the magnetic recording disk 13 at a location remoter from the center of the magnetic recording disk 13. The slope 34 extends along the path of movement of the load bar 25.

Figure 3:
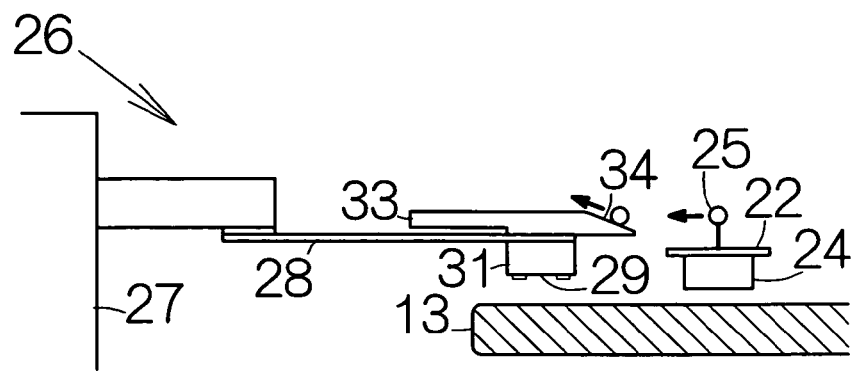
FIG. 3 is an enlarged side view of the HDD for schematically illustrating the ramp member assembly when a magnetic recording disk stops rotating.

Now, assume that the magnetic recording disk 13 stops rotating. When the reading or writing operation has been completed, the power source 23 operates to drive the actuator arms 21 toward the standby position in a normal direction around the support shaft 19. When the flying head slider 24 is opposed to the non-data zone or landing zone beyond the outermost recording track 16, the load bar 25 contacts the slope 34 on the ramp member 34, as shown in FIG. 3, for example. A further swinging movement of the actuator arm 21 causes the load bar 25 to climb up the slope 34. As the load bar 25 moves upward along the slope 34, the flying head slider 24 gets more remote from the surface of the magnetic recording disk 13. The load bar 25 is in this manner received on the ramp member 33. Since the flying head slider 24 is removed from the surface of the magnetic recording disk 13, the lift is lost on the air bearing surface of the flying head slider 24. On the other hand, since the load bar 25 is held on the ramp member 33, the flying head slider 24 is reliably prevented from colliding with or contacting the magnetic recording disk 13 without airflow acting on the air bearing surface.

Here, the air bearing surface 29 of the flying slier 31 can be designed to establish a predetermined lift in the same manner as the flying head slider 24. The flying height of the flying slider 31 can thus be controlled with a higher accuracy. Accordingly, the slope 34 of the ramp member 33 on the flying slider 31 can be kept at a predetermined height or level above the surface of the magnetic recording disk 13 with a higher accuracy. For example, even if the extent of the slope 34 is reduced in the vertical direction perpendicular to the surface of the magnetic recording disk 13, the load bar 25 is reliably received on the slope 34. At the same time, the extent of the slope 34 can sufficiently be reduced in the radial direction of the magnetic recording disk 13. The ramp member 33 can retreat to the utmost from the surface of the magnetic recording disk 13. The retreat of the ramp member 33 enables the disposition of the outermost recording track 16 closest to the periphery of the magnetic recording disk 13. The data zone 17 can thus be expanded.

Figure 4:
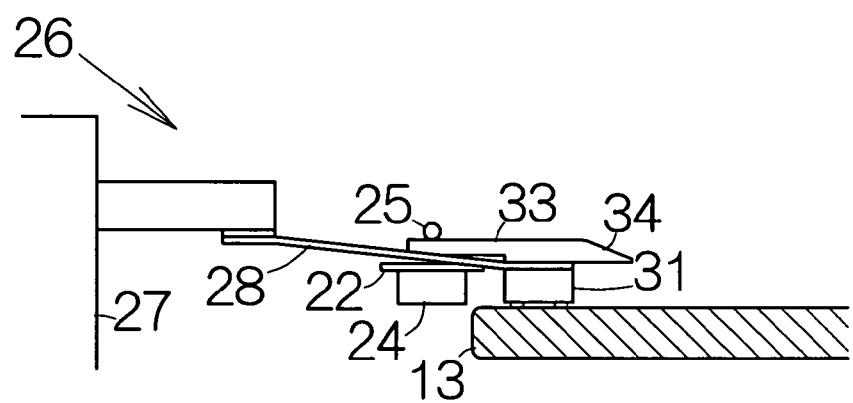
FIG. 4 is an enlarged side view of the HDD for schematically illustrating the ramp member assembly when the magnetic recording disk stands still.

When the actuator arm 21 has reached the standby position, the rotation of the magnetic recording disk 13 is terminated. The lift disappears from the air bearing surface 29 of the flying slider 31. The elastic suspension 28 exhibits the elastic force to urge the flying slider 31 against the surface of the magnetic recording disk 13, as shown in FIG. 4. The flying slider 31 allows the adsorption prevention pads 32 to contact the surface of the magnetic recording disk 13. In general, the flying head slider 24 is required to fly at a smaller flying height since the flying head slider 24 is utilized to read and write data from and into the magnetic recording disk 13. On the other hand, the flying slider 31 is not required to fly at a smaller flying height as same as the flying head slider 24 is required. Accordingly, the adsorption prevention pads 32 of the flying slider 31 is allowed to have a sufficient height from the air bearing surface 29. Adsorption of the flying slider 31 is thus reliably prevented.

Here, the flying slider 31 receives the urging force not only from the elastic suspension 28 incorporated in the ramp member assembly 26 but also from the elastic head suspension 22 in the head actuator 18. Since the flying slider 31 is not utilized to read and write data from and into the magnetic recording disk 13, the elastic suspension 28 is allowed to exhibit a larger urging force. Even if a larger impact is applied on the HDD 11, for example, the flying slider 31 keeps contacting the surface of the magnetic recording disk 13. The flying slider 31 is prevented from colliding against the magnetic recording disk 13.

When the HDD 11 receives the instructions to write and read, the magnetic recording disk 13 starts rotating. The rotation of the magnetic recording disk 13 causes the flying slider 31 to fly above the surface of the magnetic recording disk 13. When the rotation of the magnetic recording disk 13 has entered the steady state, the flying slider 31 keeps flying at a predetermined flying height. The power source 23 operates to drive the actuator arms 21 in the reverse direction opposite to the aforementioned normal direction. The load bar 25 thus moves downward toward the slope 34. A further swinging movement of the actuator arms 21 allows the load bar 25 to move downward along the slope 34.

While the load bar 25 moves downward along the slope 34, the flying head slider 24 gets opposed to the surface of the magnetic recording disk 13. The flying head slider 24 starts receiving the airflow generated along the rotating magnetic recording disk 13. The lift acts on the air bearing surface of the flying head slider 24. When the actuator arms 21 further swings around the support shaft 19, the load bar 25 takes off from the slope 34, namely from the ramp member 33. Since the magnetic recording disk 13 rotates in the steady state, the flying head slider 24 is allowed to fly above the surface of the magnetic recording disk 13 without any support of the ramp member 33.

Figure 5:
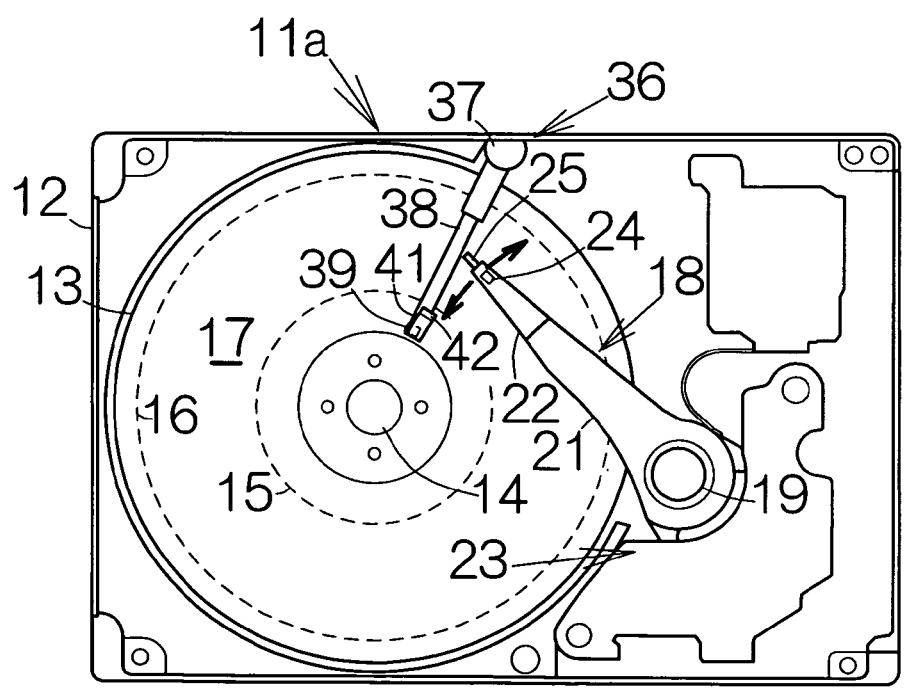
FIG. 5 is a plan view schematically illustrating the structure of a hard disk drive (HDD) according to a second embodiment of the present invention.

FIG. 5 schematically illustrates the inner structure of a HDD 11a as an example of a magnetic recording disk drive according to a second embodiment of the present invention. The HDD 11a includes a ramp member assembly 36 assembled therein in the same manner as described above. As is apparent from FIG. 5, the ramp member assembly 36 includes an attachment base 37 fixed on the bottom plate of the main enclosure 12 outside the magnetic recording disk 13. Elastic suspensions 38 are attached to the attachment base 37. The elastic suspensions 38 extend in the horizontal direction toward the rotation axis of the spindle motor 14.

The elastic suspensions 38 extend across the corresponding data zones 17 along the radial direction of the magnetic recording disk 13. The tip end of the elastic suspension 38 reaches the non-data zone defined inside the innermost recording track 15. A flying slider 39 is attached to the tip end of the individual elastic suspension 38 in the same manner as described above. The flying slider 39 is designed to oppose its air bearing surface to the surface of the magnetic recording disk 13. The air bearing surface of the flying slider 39 may be opposed to the non-data zone inside the innermost recording track 15 on the magnetic recording disk 13.

A ramp member 41 is fixed on the flying slider 39. A slope 42 is defined on the ramp member 41. The slope 42 is designed to gradually get remoter from the surface of the magnetic recording disk 13 at a location closer to the center of the magnetic recording disk 13. The slope 42 extends along the path of movement of the load bar 25.

The HDD 11a of the second embodiment enables the disposition of the ramp member 41 or slope 42 inside the innermost recording track 15. No additional non-data zone or landing zone is required outside the outermost recording track 16 on the magnetic recording disk 13. The outermost recording track 16 can be located at a position closest to the periphery of the magnetic recording disk 13. Moreover, the magnetic recording disk 13 allows an outer recording track to hold a larger amount of data as compared with an inner recording track. Accordingly, the disposition of the outermost recording track 16 closest to the periphery of the magnetic recording disk 13 enables an efficient increase in the volume of recorded data.

Figure 6:
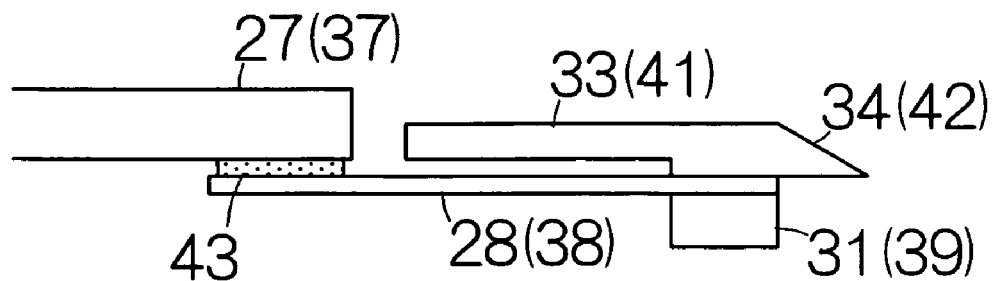
FIG. 6 is an enlarged side view of the ramp member assembly for schematically illustrating a piezoelectric element as a drive member interposed between an attachment base and an elastic suspension.
Figure 7:
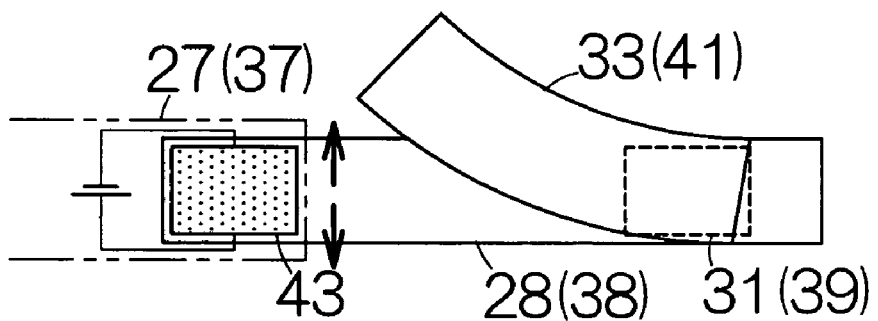
FIG. 7 is an enlarged plan view of the ramp member assembly for schematically illustrating the function of the piezoelectric element.

As shown in FIG. 6, a drive member 43 may be interposed between the attachment base 27, 37 and the elastic suspension 28, 38 in the ramp member assembly 26, 36, for example. The drive member 43 may be made of a piezoelectric element, for example. The piezoelectric element elongates and shrinks in response to the applied voltage. As shown in FIG. 7, the elongation and shrinkage of the piezoelectric element causes a minute movement or displacement of the flying slider 31, 39 along the surface of the magnetic recording disk 13. This minute movement serves to disengage the flying slider 31, 39 from adsorption to the magnetic recording disk 13. Alternatively, the piezoelectric element may be interposed between the elastic suspension 28, 38 and the flying slider 31, 39.

Figure 8:
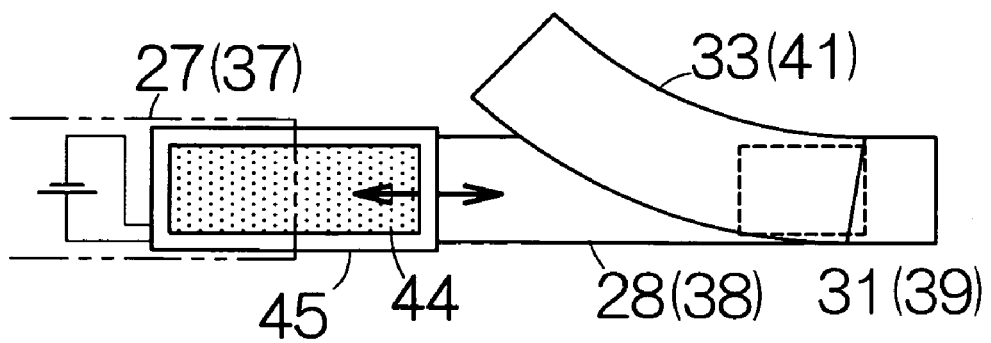
FIG. 8 is an enlarged plan view of the ramp member assembly for schematically illustrating the function of a thermally deformative element as a drive member.

As shown in FIG. 8, a thermally deformative element 44 maybe employed as the drive member 43 in place of the piezoelectric element. A heater or electrothermal coil 45 is wound around the thermally deformative element 44, for example. Heat is generated at the electrothermal coil 45 in response to supply of electric current. When the electrothermal coil 45 generates heat, the thermally deformative element 44 is allowed to expand based on the thermal expansion coefficient unique to the thermally deformative element 44. The thermally deformative element 44 is allowed to elongate and shrink in the longitudinal direction based on the thermal expansion coefficient. In this manner, the elongation and shrinkage of the thermally deformative element 44 causes a minute movement or displacement of the flying slider 31, 39 along the surface of the magnetic recording disk 13. This minute movement serves to disengage the flying slider 31, 39 from adsorption to the magnetic recording disk 13. Alternatively, the thermally deformative element 44 may be interposed between the elastic suspension 28, 38 and the flying slider 31, 39.

Figure 9:
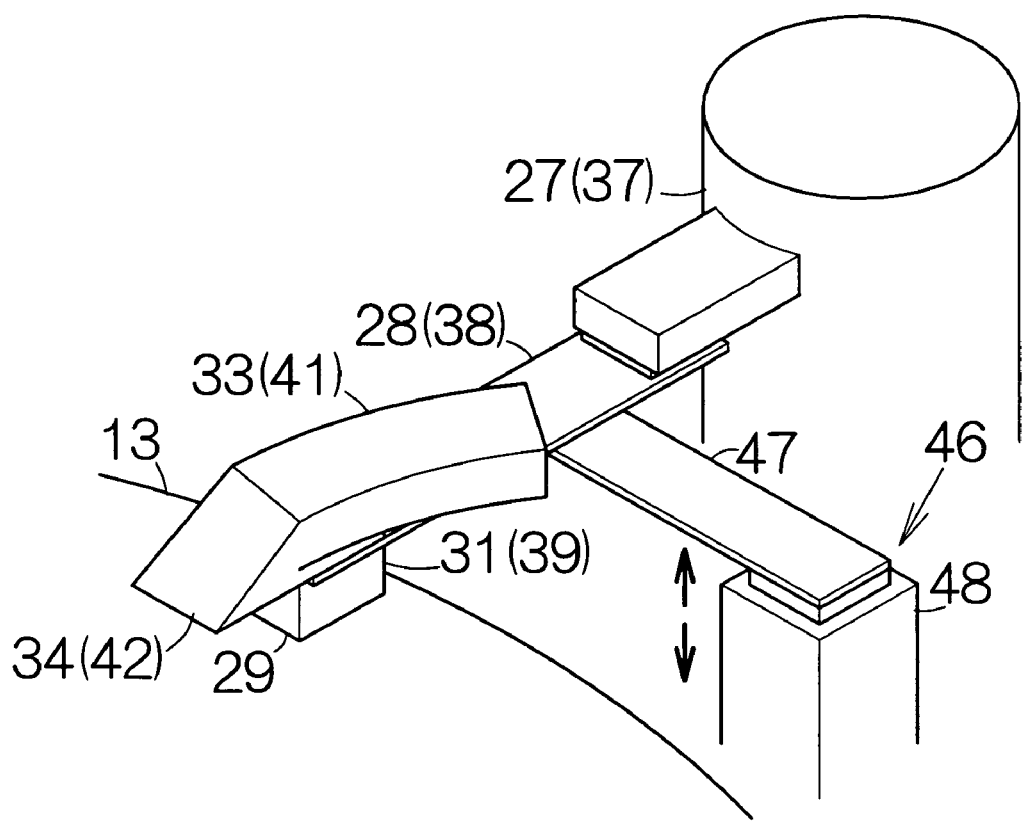
FIG. 9 is an enlarged perspective view illustrating an example of a lift mechanism incorporated in the ramp member assembly.

Otherwise, a lift mechanism 46 may be incorporated in the ramp member assembly 26, 36. As shown in FIG. 9, the lift mechanism 46 includes a contact member 47 designed to move in the vertical direction perpendicular to a plane including the surface of the magnetic recording disk 13. The contact member 47 reciprocates in the vertical direction between an operative position and a standby position. The level of the standby position is set lower than that of the operative position relative to the surface of the magnetic recording disk 13. A drive mechanism 48 may be employed to realize the reciprocating movement of the contact member 47. The drive mechanism 48 may include a driving power source such as an electric motor and a transmission member set such as gears and cams designed to transmit the driving force of the power source, for example.

The contact member 47 is positioned at the operative position prior to the termination of the rotation of the magnetic recording disk 13. The contact member 47 at the operative position contacts the elastic suspension 28, 38. The contact member 47 serves to move the elastic suspension 28, 38 upward so as to distance the elastic suspension 28, 38 away from the magnetic recording disk 13. When the magnetic recording disk 13 subsequently stops rotating, the lift disappears from the flying slider 31, 39. The flying slider 31, 39 at the tip end of the elastic suspension 28, 38 is distanced from the surface of the magnetic recording disk 13 irrespective of the disappearance of the lift. The flying slider 31, 39 is reliably kept at a position distanced from the surface of the magnetic recording disk 13. Even when the magnetic recording disk 13 stands still, the flying slider 31, 39 is prevented from contacting the surface of the magnetic recording disk 13. The flying slider 31, 39 is prevented from receiving adsorption from the surface of the magnetic recording disk 13.

On the other hand, when the rotation of the magnetic recording disk 13 has enters the steady state, the lift mechanism 46 drive the contact member 47 downward to the standby position. The flying slider 31, 39 is allowed to receive a predetermined lift on the air bearing surface. The contact member 47 is released from the contact with the elastic suspension 28, 38. The elastic suspension 28, 38 starts applying a predetermined urging force to the flying slider 31, 39. The flying slider 31, 39 is thus allowed to fly above the magnetic recording disk 13 at a designed flying height.

Figure 10:
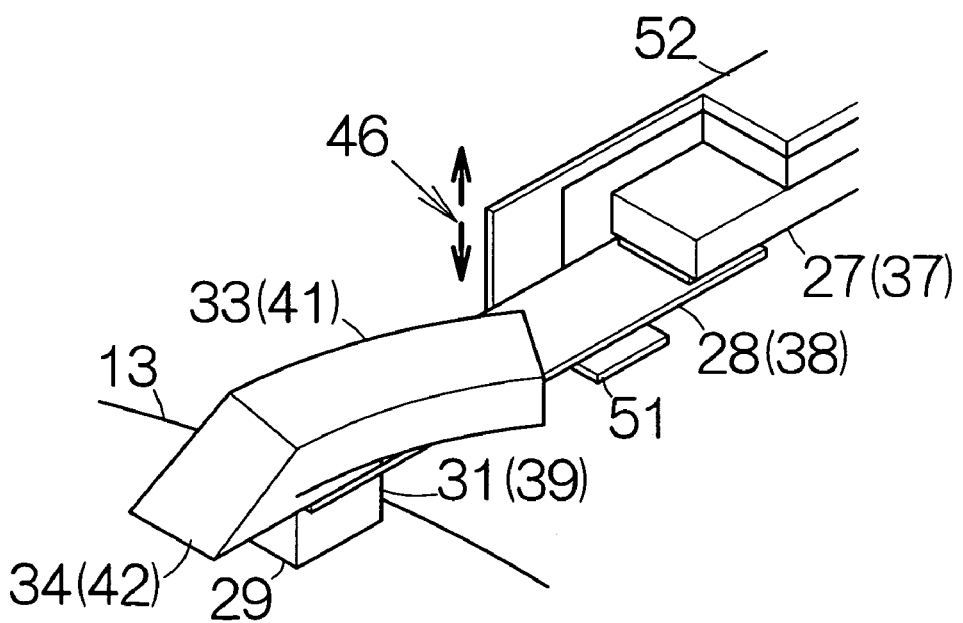
FIG. 10 is an enlarged perspective view illustrating another example of a lift mechanism incorporated in the ramp member assembly.

As shown in FIG. 10, the aforementioned contact member 47 may be replaced with a contact member 51 in the lift mechanism 46, for example. The contact member 51 is allowed to reciprocate in the vertical direction between an operative position and a standby position. The level of the standby position is set lower than that of the operative position relative to the surface of the magnetic recording disk 13. A drive mechanism 52 may be employed to realize the reciprocating movement of the contact member 51. The drive mechanism 52 may include a driving power source such as an electric motor and a transmission member set such as gears and cams designed to transmit the driving force of the power source, for example. The contact member 51 and the drive mechanism 52 may be supported on the attachment base 27, 37, for example.

What is claimed is:
1. A recording medium drive comprising:
a recording medium;
a head slider opposing an air bearing surface to a surface of the recording medium;

a load bar fixed to the head slider;

a ramp member defining an inclined surface getting more remote from the surface of the recording medium along a path of movement of the load bar, said ramp member receiving the load bar at the inclined surface; and a flying slider opposing an air bearing surface to the recording medium, said flying slider supporting the ramp member.

2. The recording medium drive according to claim 1, further comprising:

a first support member supporting the flying slider;

a second support member fixed to an enclosure containing at least the recording medium and the head slider; and a drive member interposed between the first and second support members, said drive member generating a relative displacement between the first and second support members.

3. The recording medium drive according to claim 2, wherein said first support member is an elastic suspension.

4. The recording medium drive according to claim 3, further comprising a lift mechanism contacting at least one of the elastic suspension and the flying slider, said lift mechanism designed to hold the flying slider at a position spaced from the surface of the recording medium.

5. A ramp member assembly for a recording medium drive, comprising:

a flying slider opposing an air bearing surface to a surface of the recording medium; and a ramp member fixed to the flying slider, said ramp member defining an inclined surface getting more remote from the surface of the recording medium.

* * * * *